United States Patent [19]

Knight

[11] 4,018,868

[45] Apr. 19, 1977

[54] THERMAL CRUSHING OF ALKALI COMPOUNDS IN THE REMOVAL OF SULFUR DIOXIDES FROM A FLUE GAS

[75] Inventor: John H. Knight, Aurora, Colo.

[73] Assignee: The Superior Oil Company, Houston, Tex.

[22] Filed: Mar. 19, 1975

[21] Appl. No.: 559,930

[52] U.S. Cl. ............................................. 423/244
[51] Int. Cl.$^2$ ...................... B01J 8/00; C01B 17/00
[58] Field of Search ........................ 423/242–244, 423/206, 206 T; 241/1

[56] References Cited

UNITED STATES PATENTS

| 734,240 | 7/1903 | Propfe ................................. 241/1 |
| 1,679,857 | 8/1928 | France ................................. 241/1 |
| 2,718,453 | 9/1955 | Beckman ........................... 423/555 |
| 3,505,008 | 4/1970 | Frevel et al. ....................... 423/244 |
| 3,520,649 | 7/1970 | Tomany et al. .................... 423/555 |
| 3,880,629 | 4/1975 | Dulin et al. ......................... 423/244 |

*Primary Examiner*—Oscar R. Vertiz
*Assistant Examiner*—Gregory A. Heller
*Attorney, Agent, or Firm*—Arnold, White & Durkee

[57] ABSTRACT

Alkali metal and alkaline earth metal carbonate compounds (in a variety of forms), including sodium ores of nahcolite and calcium ores of limestone, can be thermally comminuted or crushed. Size reduction is accomplished by a thermal treatment process called thermal crushing. The solids are subjected to a high temperature environment which causes a rapid temperature rise within the solid particles. This rapid temperature rise apparently results in a rapid generation of gases within the particle that exceeds the rate at which the gases can escape, thus resulting in a pressure buildup inside the solid particles. This causes the particles to explode or disintegrate into many smaller particles or powder.

The resulting generation of small particles or powder by thermal crushing of thermally crushable carbonate compounds improves their application for removing reactive gaseous impurities, such as sulfur dioxide, $NO_x$, etc., from a flue gas. To remove such gaseous impurities, the small particles or powder produced by thermal crushing are introduced into a flue gas when the flue gas is at a temperature up to 1,500° F.

9 Claims, 3 Drawing Figures

THERMAL CRUSHING OF ALKALI COMPOUNDS IN THE REMOVAL OF SULFUR DIOXIDES FROM A FLUE GAS

BACKGROUND OF THE INVENTION

1. Field of the Invention

This invention relates to a method of reducing the content of reactive gaseous impurities, such as $SO_2$, $NO_x$ and other reactive gases, from a flue gas or other fluid stream by utilization of a thermally crushed alkali metal or alkaline earth metal carbonate compound (in a variety of forms), the small particle size of the thermally crushed material improving its ability to remove the reactive gas. More particularly, this invention relates to the removal of reactive gases from a flue gas, particularly $SO_2$, by introducing the thermally crushed small particles or powder into the flue gas when the flue gas is a temperature up to 1,500° F.

2. Description of the Prior Art

Sulfur dioxide is one of the major pollutants from the burning of sulfur bearing fuels. The major tonnage of sulfur dioxide is discharged to the air from steam power plants and furnaces which typically burn coal and residual oils ranging in sulfur content from one to four percent and produce a flue gas concentraion of sulfur dioxide ranging from 800 to about 3,000 parts per million. Metal ore smelting furnaces also generate $SO_2$ with concentrations up to 20,000 ppm. It has been estimated that some 25 million tons of sulfur dioxide per year are poured into the atmosphere of the United States. This has caused a tremendous pollution problem and an onslaught of proposed techniques for reducing the sulfur dioxide content of flue gases or stack gases from burning combustible products.

In attempts to remove the sulfur dioxide from the gaseous streams, a number of different processes have been proposed and tried. There are numerous suggestions that the sulfer dioxide can be removed from gases by washing the gases with aqueous solutions of alkaline materials. Unfortunately, field trials using these wet scrubbers have been somewhat disappointing and the sulfur dioxide removal achieved has been disappointing. Due to the failure of such wet scrubbing systems, considerable attention has been directed recently to solid systems or other types of systems where the sulfur dioxide can be removed from the gas without using an aqueous scrubbing medium.

For example, it has been suggested that sulfur dioxide can be separated from a gas on solid absorbants such as calcium and sodium carbonate. Because sodium carbonate reacts slowly with sulfur dioxide at normal flue gas temperatures, even more recent proposals have suggested that the flue gas can be contacted with a molten bath of sodium carbonate, with the higher temperature enhancing the rate of reaction.

Still further, very recent attention has been given to the injection of fine powders into a furnace so as to react with or absorb the sulfur dioxide, removing it from the flue gas. However, reports of a maximum of only about 40 percent sulfur dioxide removal through this procedure have been made. One of the principal materials proposed for such injection is limestone powder.

The removal of sulfur dioxide and particulate matter from flue gases through the use of an alkali metal bicarbonate has been suggested in U.S. Pat. Nos. 3,505,008 and 3,589,863 to Ludo K. Frevel and Leonard J. Kressley. The former patent suggests the removal of fly ash and sulfur dioxide from a gas stream by flowing the gas stream through a thin porous bed containing alkali metal bicarbonate crystalline solids having a mesh size predominantly within the range of from about 20 up to about 120 mesh. The latter patent suggests the removal of sulfur dioxide and particulate matter from a gaseous stream by contacting the gaseous stream with porous alkali metal bicarbonate aggregates. While each of these methods is somewaht effective in the removal of sulfur dioxide from a flue gas, neither method is sufficiently effectve to be commercially attractive. Accordingly, the art has still sought a method for the removal of sulfur dioxide from a flue gas which can effectively eliminate the sulfur dioxide impurities in great amounts. This has been achieved through the method of the present invention.

In a similar manner, various processes have been proposed for the reduction of $NO_x$ (NO and $NO_2$) content and for the reduction of other reactive gas pollutants. $NO_x$ is a chief pollutant in the stack gas of a nitric acid plant, while $SO_2$ and $NO_x$ are together chief pollutants in power plant stacks. Until the present invention, the art still sought a sucessful method of reducing these pollutants. This has again been achieved in accordance with the present invention.

SUMMARY OF THE INVENTION

The injection of nahcolite directly into the high temperature zone in a boiler, furnace, incinerator, etc., is described in the copending patent application Ser. No. 559,816 entitled Method of Reducing Sulfur Dioxide Emissions Using Nahcolite.

This method is very effective in removing $SO_2$ and other reactive gases; however, this method has the disadvantages of possibly adversely affecting the boiler or furnace perfomance due to slagging, corrosion, erosion of components and/or contamination of products, etc., in view of the fallout of the reacted nahcolite.

The present invention eliminates the above disadvantages by first thermally crushing an alkali metal or alkaline earth metal carbonate compound (in a variety of forms), preferably nahcolite, and then injecting the thermally crushed small particles or powder into the exit gas stream (gas stream after or leaving the boiler, furnace, etc.). These exit flue gases are typically at a temperature up to 1,500° F, most generally in the 200° to 1,500° F range. At this lower temperature, the corrosion, erosion and other adverse effects will not occur or will be greatly reduced.

Size reduction of the alkali metal or alkaline earth metal carbonate compound is accomplished in accordance with the present invention in a high temerature zone at a temperature of from about 2,000° to about 4,000° F. The thermally crushed small particles generally have a predominant particle size within the range of about 0.1 to about 100 microns. A period of contact between the thermally crushed small particles and flue gas containing sulfur dioxide, $NO_x$, or other reactive gas impurities of up to about ten seconds, peferably from about 1 to about 6 seconds, allows for the effective reduction of the sulfur dioxide, $NO_x$, or other impurity content.

The method of the present invention for the reduction of the sulfur dioxide content of a flue gas is preferably carried out through the following sequence of steps:

a. introducing particle alkali metal or alkaline earth metal carbonate compound, preferably an alkali metal bicarbonate, most preferably nahcolite, into a first zone heated to a temperature of from about 2,000° to about 4,000° F so as to produce a size reduction to a predominant particle size within the range of about 0.1 to about 100 microns;

b. transporting the thermally crushed small particles or powder to a second zone containing flue gas having sulfur dioide, $NO_x$, or other reactive gas impurities, the temperature of the flue gas being up to 1,500° F, preferably 200° to 1,500° F.

c. contacting the thermally crushed small particles or powder with the flue gas for a period of time sufficient to allow the small particles to combine with the sulfur dioxide, $NO_x$, or other reactive gas impurities in the flue gas; and d. removing from the flue gas the thermally crushed small particles or powder containing combined sulfur dioxide, $No_x$, etc.

Most preferably in accordance with the present invention, the flue gas is produced by a boiller, furnace, incinerator, or other similar source and the thermally crushed small particles or powder, preferably thermally crushed nahcolite, are contacted with the flue gas in an exit duct leading from the source to a stack open to the atmosphere. Alternatively, the alkali metal or alkaline earth metal carbonate compound can be advantageously thermally crushed in a thermal crushing zone outside the boiler, furnace, incinerator, etc., and transported to the exit duct for contact with the flue gas. Still further, the alkali metal or alkaline earth metal carbonate compound can be thermally crushed in a thermal crushing zone located in the boiler, furnace, incinerator, or other exit duct.

A particle extractor is located in the exit duct between the zone of contact of the thermally crushed small particles or powder and the flue gas and the stack open to the atmosphere so as to remove the thermally crushed small particles or powder containing combined sulfur dioxide, $NO_x$, etc.

While the following description will stress the applicability of the method of the present invention in reducing the sulfur dioxide content of a flue gas, in effect, the method of the present invention achieves the removal of virtually any reactive gas, specifically acid reactive gases, such as $SO_2$, $NO_x$, halogen, etc. Accordingly, the present invention is not limited to the removal of any particular gas.

The thermal crushing carried out in accordance with the present invention is a phenomenon associated with certain alkali metal and alkaline earth carbonate compounds, and nahcolite in particular. In effect, any and all of such compounds which are capable of undergoing the phenomenon of thermal crushing can be advantageously utilized in accordance with the present invention. Exemplary compounds are alkali metal, i.e., sodium and potassium carbonates, bicarbonates, hydrated carbonates, etc., as wall as alkaline earth metal carbonate compounds, i.e., calcium ore of limestone, etc. Of these, alkali metal bicarbonates show the most pronounced thermal crushing behavior, with the most advantageous results being achieved with nahcolite, a naturally occurring sodium bicarbonate. It is assumed that the other minerals present in nahcolite, i.e., sodium carbonate, calcium carbonate, magnesium carbonate, etc., partly react with the sulfur dioxide, $NO_x$, or other reactive gas due to the small particle size and increased surface area, thereby exposing these other alkali comounds to the gas. As used throughout, the expressions "thermally crushable carbonate compound" or "thermally crushed carbonate compound" are meant to embrace any and all of the foregoing and equivalent materials.

The thermally crushable carbonate compounds can be thermally crushed upon exposure to temperatures between about 2,000° and 4,000° F; of course, slightly lower and higher temperatures may be applicable for some purposes. The particle size of the starting material does not appreciably affect the thermal crushing reaction. Particles within the range of from about ½inch diameter to −400 mesh can be effectively reduced to a predominant particle size within the range of 0.1 to 100 microns through thermal crushing. Moreover the thermal crushing of alkali metal bicarbonates and related compounds, and nahcolite in particular, is not appreciably affected by the environment within the thermal crusher, other than the required temperature. The temperatures effective to accomplish the thermal crushing of the alkali metal bicarbonate and other thermally crushable carbonate compound can be achieved by any suitable type of burner; gas, oil, coal, etc., or an electric heater or arc. However, direct contact between the paticles and a flame within the above mentioned temperature range is an effective method to produce thermal crushing.

Thermal crushing is believed to be caused by the rapid temperature rise of the particles, the increase in temperature causing the particles to decompose, evaporate water or otherwise evolve gases, i.e., sodium bicarbonate decomposes and $CO_2$ and $H_2O$ gases are evolved. When the gases formed are generated at a higher rate than they can diffuse or escape from the particles, a pressure buildup inside the particles results and this pressure causes the particles to disintegrate or explode into many smaller particles. In this way, the larger particles are thermally crushed to smaller particles or powder having a predominant particle size within the range of from about 0.1 to about 100 microns.

Due to the high temperaures that are created in a boiler or similar combustion zone, the introduction into the boiler combustion zone of a thermally crushable carbonate compound, such as nahcolite, will establish a desirable thermal crushing environment and the thermally crushable carbonate compound will be thermally crushed in the combustion zone and a thermally crushed powder will be available for contact with any sulfur dioxide, $NO_x$, or other reactive gas impurities. Such introduction of the thermally crushable carbonate compound into a combustion zone, however, has several disadvantages including, for example, corrosion and/or erosion of metal and refractory components within the apparatus, i.e., furnace or boiler; slagging and/or plugging of the apparatus due to solids fusion and/or additional solids load; reduction in the efficiency of the apparatus, especially the heat transfer efficiency; and undersirable effects on processes and reactions taking place in the apparatus, particularly glass or smelter furnaces. Each of these disadvantages is associated with the undesirable precipitation of solids within a furnace or boiler out of the gas stream or deposits on components. Each is eliminated in accordance with the present invention wherein the thermally crushable carbonate compound, particularly nahcolite, is thermally crushed in a thermal crushing zone and the thermally crushed small particles or powder are contacted with a flue gas containing sulfur dioxide, $NO_x$, or other reactive gas impurities at a temperature up to 1,500° F, i.e., outside the combustion zone.

Accordingly, it is a principal feature of the present invention to provide a method of reducing the reactive gas impurity content of a flue gas, which method eliminates the deficiencies and disadvantages of previously proposed methods, such method of the present invention providing effective reduction of the impurity content by contacting a flue gas with a thermally crushed carbonate compound, preferably thermally crushed nahcolite.

It is a further feature of the present invention to provide a method of reducing the sulfur dioxide content of a flue gas wherein a thermally crushable carbonate compound is thermally crushed at a temperature of about 2,000° to about 4,000° F and the thermally crushed powder having a predominant particle size within the range of about 0.1 to about 100 microns is contacted at a temperature of up to 1,500° F with a flue gas containing sulfur dioxide impurities.

Yet a further feature of the present invention resides in such method of reducing the sulfur dioxide content of a flue gas wherein the thermally crushable carbonate compound, preferably thermally crushed nahcolite, and flue gas containing sulfur dioxide are contacted for a period of up to about 10 seconds, preferably from about 1 to about 6 seconds, and thereafter the thermally crushed powder containing combined sulfur dioxide is separated and removed from the flue gas.

A still further feature of the present invention resides in such method of reducing the sulfur dioxide content of a flue gas wherein particulate nahcolite is introduced into a zone heated to a temperature of from about 2,000° to about 4,000° F so as to produce thermally crushed nahcolite; the thermally crushed nahcolite is transported to a second zone containing a flue gas having sulfur dioxide impurities, the flue gas being at a temperature up to 1,500° F; the thermally crushed nahcolite and flue gas are allowed to remain in contact for a period of time sufficient to allow the thermally crushed nahcolite to combine with sulfur dioxide impurities in the flue gas; and thereafter, the thermally crushed nahcolite containing combined sulfur dioxide is removed from the flue gas or deposited in removal equipment, e.g., bag filter.

It is a further feature of the present invention to provide a method of reducing the sulfur dioxide content of a flue gas wherein the flue gas is produced in a boiler, furnace, incinerator, etc., and the thermally crushed carbonate compound, preferably thermally crushed nahcolite, is contacted with the flue gas in a exit duct leading from the boiler, furnace, incinerator, etc., to a stack open to the atmosphere.

Yet a further feature of the present invention lies in such method of reducing the sulfur dioxide content of a flue gas wherein a thermally crushable carbonate compound, preferably nahcolite, is thermally crushed in a thermal crushing zone outside or within a boiler, furnace, incinerator or other eixt duct leading from a boiler, furnace, incinerator, etc., to a stack open to the atmosphere and a particle extractor is located between the zone of contact between the thermally crushed small particles or powder and flue gas and open stack so as to remove the thermally crushed small particles or powder containing combined sulfur dioxide.

Still further features and advantages of the method of the present invention will become more apparent from the following, more detailed description of the present invention, specifically in reference to the accompanying drawings and description of preferred embodiments.

BRIEF DESCRIPTION OF THE DRAWINGS

In the drawings, which represent non-limiting preferred embodiments of the present invention.

DESCRIPTION OF PREFERRED EMBODIMENTS

Figure 1:
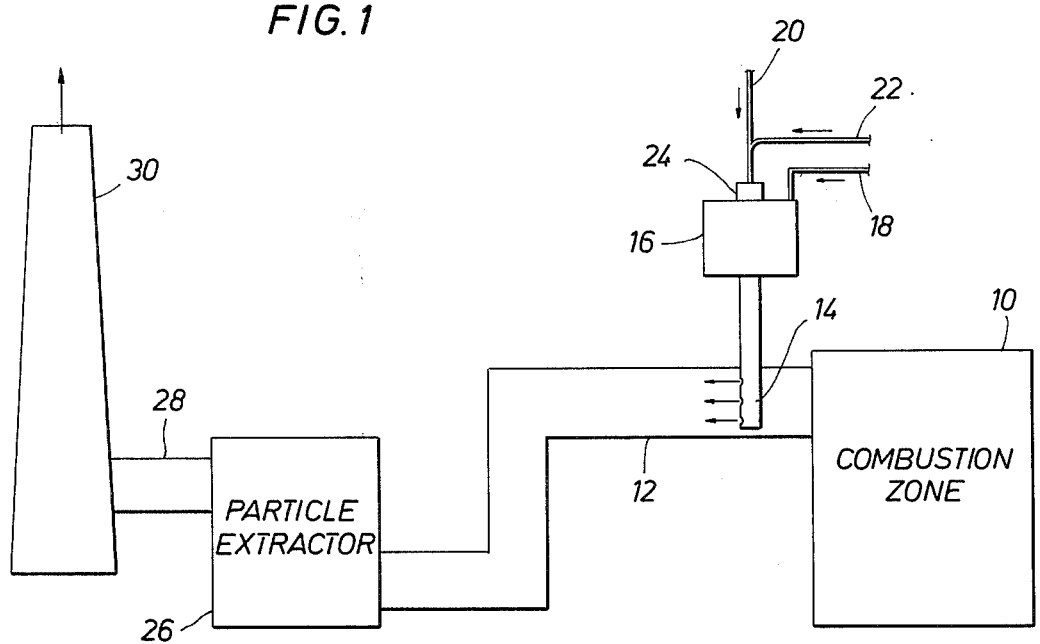
FIG. 1 is a flow diagram illustrating apparatus useful in carrying out the method of the present invention.

The foregoing features and advantages of the present invention are achieved through a method of reducing the sulfur dioxide, $NO_x$, or other reactive gas content of the flue gas by introducing into a flue gas containing such impurities a thermally crushed carbonate compound, such compound being introduced in an amount effective to reduce the sulfur dioxide, $NO_x$, or other reactive gas content of the flue gas.

In accordance with the present invention, the thermally crushed powder is formed by introducing a particulate thermally crushable carbonate compound into a thermal crushing zone heated to a temperature within the range of about 2,000° to about 4,000° F. The advantageous results achieved in accordance with the present invention are in no way affected by the environment in which the thermally crushed powder is produced. The thermal crushing zone in accordance with the present invention can be any suitable type of burner, either gas, oil, or coal, or can be an electric heater, electric arc, or other means for producing the foregoing temperature environment.

Regardless of the article size of the starting thermally crushable carbonate compound, thermal crushing at a temperature within the range of about 2,000° to 4,000° F produces a thermally crushed powder having a predominant particle size within the range of 0.1 to 100 microns, with a mean particle size of 1 to 20 microns. Typically, the particles introduced into the thermal crushing zone have a particle size ranging from about ½ inch diameter to −400 mesh. Typical particle sizes for nahcolite prior to and subsequent to thermal crushing can be found in the following table:

| Feed | | Thermally Crushed Powder | |
|---|---|---|---|
| Wt. % | Size, Mircons | Wt. % | Size, Microns |
| 9.3 | −208 +147 | 35.12 | +10.8 |
| 14.6 | −147 +104 | 1.79 | −10.8 + 6.7 |
| 16.0 | −104 + 74 | 4.76 | − 6.7 + 4.5 |
| 18.4 | − 74 + 61 | 1.19 | − 4.5 + 3.2 |
| 11.3 | − 61 + 50.9 | 7.74 | − 3.2 + 2.0 |
| 30.5 | −50.9 | 3.57 | − 2.0 + 1.0 |
| | | 4.17 | − 1.0 + 0.6 |
| Mean Size Reduction | | 4.76 | − 0.6 + 0.4 |
| Ratio = 38:1 | | 36.90 | − 0.4 |
| $D_m$ = 68 Microns | | $D_m$ = 1.79 Microns | |
| Mass Median Diameter | | Mass Median Diameter | |

In accordance with the present invention, the thermally crushed powder is transported to and allowed to contact a flue gas containing sulfur dioxide, $NO_x$, or other reactive gas, the flue gas being at a temperature of up to 1,500° F, preferably 200° to 1,500° F. While higher temperatures could be used, at temperatures above 1,500° F slagging, corrosion, erosion, etc., affect the duct work, components, etc. The nature of the flue gas and the manner in which the flue gas is produced are not essential parameters of the present invention. Moreover, the source of the flue gas and, in fact, the amount of reactive gas present in the flue gas are not essential parameters. Using sulfur dioxide as an example, the present invention effectively allows substantial reduction of the sulfur dioxide content of the flue gas regardless of the content of sulfur dioxide, the precise nature of the sulfur dioxide, or the origin of the sulfur dioxide within the flue gas. It is essential, however, to avoid the disadvantages enumerated previously that the flue gas be at a temperature of up to 1,500° F, preferably 200° to 1,500° F when contacted with the thermally crushed powder. This, therefore, distinguishes the method of the present invention from the introduction of a particulate thermally crushable carbonate compound into a high temperature zone of a boiler, furnace, incinerator, etc., that is maintained at a substantially higher temperature, and eliminates all of the problems and disadvantages inherent in such method.

It has been determined in accordance with the present invention that the thermally crushed powder with a mean size of 1 to 20 microns is effective to reduce the sulfur dioxide content of the flue gas within an extremely short contact time. Generally, the contact time between the thermally crushed powder and flue gas is up to about ten seconds, with the preferred contact time being from about 1 to about 6 seconds for 1 to 20 micron mean particle size powder. Any longer contact between the thermally crushed powder and flue gas does not provide a correspondingly increased reduction of the sulfur dioxide content.

Furthermore, the thermally crushed powder tends to agglomerate with the passage of time. Accordingly, as the contact between the thermally crushed powder and flue gas continues, the thermally crushed powder will tend to agglomerate and this agglomeration reduces the effectiveness of the thermally crushed powder in reducing the sulfur dioxide content of the flue gas. For this reason, prolonged contact times between the thermally crushed powder and the flue gas are not particularly desirable. However, by adjusting variables in the thermal crushing apparatus, (temperature, residence time, feed size, etc.) larger particles could be produced and utilized if desired. Thus, where removal equipment and/or longer duct work, etc., provides a longer contact residence time, larger particles may be produced that result in effective removal of $SO_2$, $NO_x$, or other reactive gas and effectve utilization of the thermally crushed powder.

The agglomeration of the thermally crushed powder may assist in the removal of the thermally crushed powder from the system after sufficient contact with the flue gas to effectively reduce its sulfur dioxide content. To achieve this removal of the thermally crushed powder from the system, a particle separator is employed downstream of the contact zone between the thermally crushed powder and flue gas. The particle separator may be any conventional unit effective for the removal of particulate solids from a gas stream. Typical units include, for example, bag houses, electrostatic precipitators, cyclones, scrubbers, etc. Particularly advantageous results with respect to the removal of the preferred thermally crushed nahcolite have been achieved through the use of an electrostatic precipitator.

When the thermally crushed powder is removed from contact with the flue gas, the thermally crushed powder has combined with it the sulfur dioxide of the flue gas. It is not known whether the thermally crushed powder is effective to reduce the sulfur dioxide content of the flue gas through a physical, surface absorption of the sulfur dioxide impurities, through a chemical reaction, or through a combination of both. Regardless of the manner in which the sulfur dioxide impurities are removed, the expression "with combined sulfur dioxide" is meant to embrace each of these possibilities and describes the thermally crushed powder in a state in which the sulfur dioxide impurities are so associated with it as to be effectively removed from the system. Equivalent descriptions are applicable when considering $NO_x$ or other reactive gas impurities.

In an ideal system, 100 percent of the sulfur dioxide impurities would be removed through the use of the thermally crushed powder at a stoichiometric ratio of thermally crushed powder to sulfur dioxide of 1.0. The system of the present invention, however, acts somewhat less than ideally, primarily due to the phenomenon of fall out and agglomeration which does not allow intimate contact of all of the thermally crushed powder with the sulfur dioxide impurities of the flue gas. For this reason, to achieve the high levels of sulfur dioxide removal in accordance with the present invention, it is often desirable to employ a stoichiometric ratio of thermally crushed powder to sulfur dioxide of greater than 1.0. Generally, the stoichiometric ratio of thermally crushed powder to sulfur dioxide of from about 0.9 to about 3.0, preferably 0.9 to 1.0, is effective in providing the desired reduction of sulfur dioxide content. The same criteria, as above, can be applied to a system for the removal of $NO_x$ or other reactive gases with equivalent results. It should be recognized, however, that slight modifications within the skill of one in the art may be necessary to obtain optimum results for any particular system.

Referring to the drawings, FIG. 1 diagrammatically illustrates one type of system which can be effectively utilized in carrying out the method of the present invention. A flue gas is generated in combustion zone 10 by the combustion of any suitable combustible product, i.e., oil, gas, coal, etc., containing sulfur or other impurities. The nature of the combustion zone 10 is, of course, a factor which does not in any way influence the method of the present invention. As illustrated, the flue gas produced in combustion zone 10 passes through duct 12 on its way to an open stack. In duct 12, the flue gas is contacted with a thermally crushed powder introduced into duct 12 through line 14. The thermally crushed powder is formed in thermal crusher 16, diagrammatically illustrated. Again, this thermal crusher can take any conventional form and is typically an oil, coal or gas burner or an electric furnace or arc. In the embodiment illustrated, the particulate thermally crushable carbonate compound e.g., particulate nahcolite, is introduced into thermal crusher 16 through line 18 and air and fuel are simultaneously introduced through lines 20 and 22 respectively. The air and fuel can be advantageously mixed in a premixing zone 24 before introduction into thermal crusher 16 so as to produce the necessary atmosphere for thermal crushing of the particulate thermally crushable carbonate compound.

Duct 12 allows sufficient contact between the thermally crushed powder and flue gas. Again, a typical contact time is up to about 10 seconds with contact time of about 1 to about 6 seconds being satisfactory for thermally crushed particles having a mean diameter of 1 to 20 microns. The contact time between the thermally crushed powder and the flue gas can easily be controlled by providing a suitable length of duct 12 corresponding to the rate of flow of flue gas in it.

As illustrated in FIG. 1, the flue gas in duct 12 passes through a particle extractor 26 to remove the thermally crushed powder with combined sulfur dioxide, $NO_x$, or other reactive gas. Again, this particle extractor can be of any conventional design, with suitable particle extractors taking the form of a bag house, electrostatic precipitator, cyclone, scrubber, etc. The effective removal of the thermally crushed powder with combined sulfur dioxide, etc., is enhanced by the agglomeration of the thermally crushed particles after contact with the flue gas.

The flue gas, having reduced sulfur dioxide content or $NO_x$ content, etc., exits the particle extractor through an outlet duct 28 and is passed to the atmosphere through an open stack 30.

Figure 2:
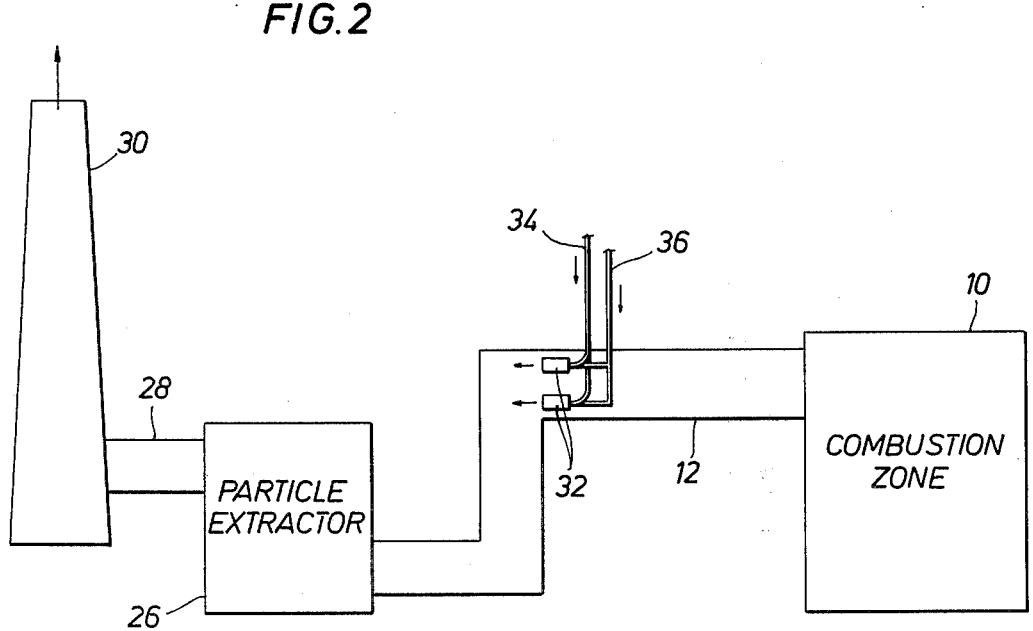
FIG. 2 is a further flow diagram illustrating alternative apparatus for carrying out the method of the present invention.

The embodiment of FIG. 2 differs from that of FIG. 1 in that while thermal crusher 16 of FIG. 1 is outside duct 12, two smaller thermal crushers 32 are located in duct 12 in the embodiment of FIG. 2. While two thermal crushers 32 are illustrated, one or more of such thermal crushers can be advantageously utilized to achieve the advantages of the present invention. In the specific embodiment illustrated, the particulate thermally crushable carbonate compound is introduced into thermal crushes 32 through line 34 while the necessary fuel and air are introduced through line 36. All other features illustrated in FIG. 2 are the same as described above in connection with FIG. 1.

In addition to carrying out the method of the present invention in the foregoing manner for the reduction of the $SO_2$ content, $NO_x$ content or the content of another reactive gas, the method of the present invention can be advantageously carried out by retaining the small particles or powder formed by the thermal crushing of the thermally crushable carbonate compound on a bag filter or similar separation unit. The small particles can be retained on such separation unit for a period of time, i.e., residence time, which allows mass transfer and reaction of the reactive gas with the small particles. This procedure requires finely ground particles of −100 mesh with particles as small as −200 mesh being suitable for proper operation. This is achieved through the thermal crushing of the thermally crushable carbonate compound. By use of the thermally crushed carbonate compound in accordance with the method of the present invention, the typical mechanical crushing and pulverizing can be eliminated and the small particles can be sufficiently dispersed in a gas stream for proper distribution on the bag filter cloth or other separation device. This, therefore, constitutes a further effective method for utilization of the principles of the present invention for the reduction of the reactive gas impurity content of a flue gas, particularly the $SO_2$ content thereof.

In addition, the selective nature of thermal crushing can be used to separate thermally crushable carbonate compounds from ores. By using standard methods of size classification, the small thermally crushed particles can be efficiently separated from impurities which remain uncrushed, resulting in separation or beneficiation of the desired ore values.

The present invention will now be described by reference to the following examples. It should be understood that these examples are presented for purposes of illustration only and the present invention cannot under any circumstances be deemed limited thereto.

EXAMPLE 1

To illustrate the effectiveness of the method of the present invention in reducing the sulfur dioxide content of a flue gas, the following materials were utilized: commercial soda ash, commercial sodium bicarbonate, commerical sodium bicarbonate (predecomposed), and nahcolite (68.4 percent sodium bicarbonate).

The test procedure was carried out by introducing each of the above materials into a thermal crushing zone heated to a temperature sufficient to create the desired thermal crushing environment, i.e., 2,000° to 4,000° F. Various levels of the sulfur dioxide were tested by introducing $SO_x$ into the flue gas.

Figure 3:
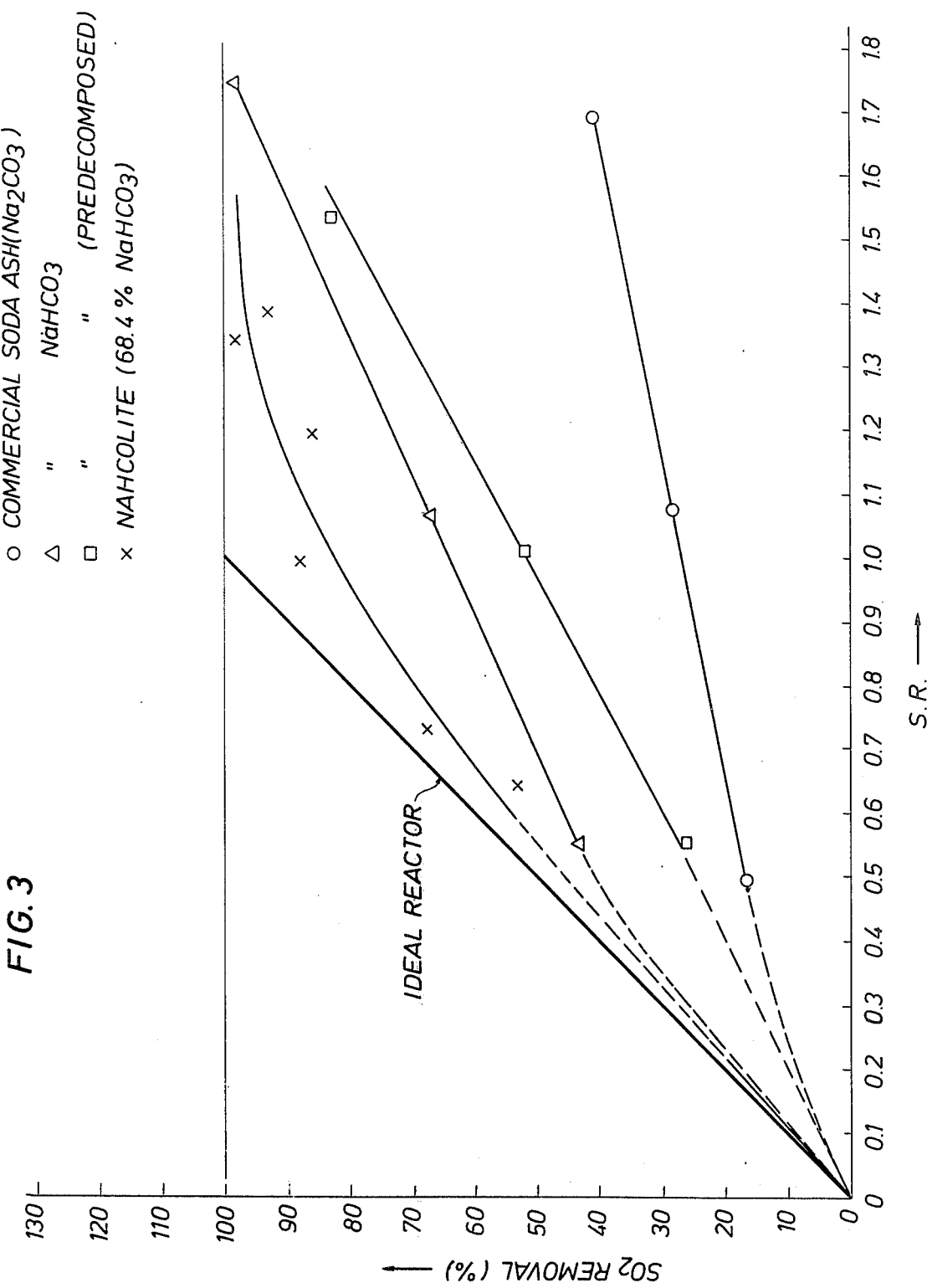
FIG. 3 is a graph illustrating the effectiveness of the method of the present invention in sulfur dioxide removal.

The percentage sulfur dioxide removal is plotted in FIG. 3 against the stoichiometric ratio for each of the materials utilized, FIG. 3 also including a line representing the ideal removal of sulfur dioxide, 100 percent removal at a stoichiometric ratio of 1.0. From the data in FIG. 3, it is noted that the nahcolite and other sodium bicarbonate powders achieve very substantial removal of sulfur dioxide and that nahcolite provides greater than 90 percent removal. The greater effectiveness of the nahcolite over commercial bicarbonate is attributed to additional alkali materials being present in the thermally crushed nahcolite powder and available for reaction.

The chemical reaction formula for using nahcolite in removing $SO_2$ are believed to occur in the following steps:

Decomposition Reaction $$2NaHCO_3 \rightarrow Na_2CO_3 + H_2O + CO_2$$

Or in part $$Na_2CO_3 \rightarrow Na_2O + CO_2$$

This decomposition reaction results in the generation of gases ($H_2O$ and $CO_2$) which cause particle size reduction. The chemical reactions after completion of mass transfer or upon contact of the alkali solid and gas molecules is:

$$Na_2CO_3 + SO_2 + \tfrac{1}{2} O_2 \rightarrow Na_2SO_4 + CO_2$$

Or in part $$Na_2O + SO_2 + \tfrac{1}{2} O_2 \rightarrow Na_2SO_4$$

Since the size reduction of alkali compounds is caused by gas evolution, the gases produced can be those formed by chemical decomposition or those formed by phase change such as chemically combined or entrained water that forms a gas phase upon an increase in the temperature. This gas generation results in a pressure buildup within the particle which in turn causes size reduction and provides an explanation of the differences in limestone and other carbonate compounds' effectiveness in removing $SO_2$ and other reaction gases. It is anticipated that the difference in $SO_2$ removal effectiveness is explained by their thermal crushing characteristic or tendency to reduce size upon exposure to a high temperature environment.

EXAMPLE 2

Using a system similar to that in Example 1, tests were carried out to determine the effectiveness of the thermally crushed nahcolite for the removal of $NO_x$. Using the EPA method of determination, eight nitrogen oxides determinations were made. This test yielded the following results in terms of parts per million by volume of $NO_2$ present in the inlet and outlet gas contacted with the thermally crushed nahcolite:

| Location | ppm Inlet | ppm Outlet |
|---|---|---|
| Test 1 | 162 | 106 |
| Test 2 | 162 | 105 |
| Test 3 | 163 | 86 |
| Test 4 | 172 | 84 |
| Average | 165 | 95 |

The effectiveness of the thermally crushed nahcolite to remove $NO_x$ is seen from the above.

While the present invention has been described primarily with regard to the foregoing exemplification of preferred embodiments, it should be apparent that variations within the scope thereof can be tolerated in accordance with the present invention. Accordingly, the preferred embodiments are presented for purposes of illustration only and the present invention is in no way deemed limited thereto but, rather, must be construed as broadly as any and all equivalents thereof.

What is claimed is:

1. A method of reducing the sulfur dioxide content of a flue gas which comprises:
   a. introducing particulate nahcolite into a first zone heated to a temperature of from about 2,000° to about 4,000° F to produce thermally crushed nahcolite of a predominant particle size within the range of from about 0.1 to about 100 microns and a mean particle size of 1–20 microns;
   b. transporting said thermally crushed nahcolite to a second zone containing a flue gas having sulfur dioxide impurities, said flue gas being at a temperature up to 1,500° F;
   c. allowing said thermally crushed nahcolite and flue gas to remain in contact for a period of time sufficient to allow said thermally crushed nahcolite to combine with the sulfur dioxide impurities in said flue gas; and
   d. removing from said flue gas said thermally crushed nahcolite containing combined sulfur dioxide.

2. The method of claim 1, wherein said flue gas and thermally crushed nahcolite are contacted for a period of up to about 10 seconds.

3. The method of claim 2, wherein the period of contact is from about 1 to about 6 seconds.

4. The method of claim 1, wherein the amount of thermally crushed nahcolite contacted with said flue gas is sufficient to provide a stoichiometric ratio of nahcolite to free and combined sulfur dioxide within the range of from about 0.9 to about 3.0.

5. The method of claim 1, wherein said thermally crushed nahcolite containing combined sulfur dioxide agglomerates prior to removal from the flue gas.

6. The method of claim 1, wherein said flue gas is produced by a boiler, furnace, or incinerator and the thermally crushed nahcolite is contacted with said flue gas in a boiler, furnace, or incinerator exit duct leading from said boiler, furnace, or incinerator to a stack open to the atmosphere.

7. The method of claim 6, wherein a particle extractor is located in said duct between a zone of contact between said thermally crushed nahcolite and flue gas and said stack to remove said thermally crushed nahcolite containing combined sulfur dioxide.

8. The method of claim 7, wherein the nahcolite is thermally crushed in a thermal crushing zone outside said duct and transported to said duct for contact with said flue gas.

9. The method of claim 7, wherein said nahcolite is thermally crushed in a thermal crushing zone located in said duct.

* * * * *